(12) United States Patent
Leijnen

(10) Patent No.: US 10,087,914 B2
(45) Date of Patent: Oct. 2, 2018

(54) ROTOR ASSEMBLY FOR A WIND TURBINE COMPRISING A PAIR OF CABLES

(71) Applicant: JOVAL NV, Kortrijk (BE)

(72) Inventor: Peter Leijnen, Bachte-Maria-Leerne (BE)

(73) Assignee: JOVAL NV, Kortrijk (BE)

( * ) Notice: Subject to any disclaimer, the term of this patent is extended or adjusted under 35 U.S.C. 154(b) by 270 days.

(21) Appl. No.: 14/787,499

(22) PCT Filed: May 23, 2014

(86) PCT No.: PCT/EP2014/060604
§ 371 (c)(1),
(2) Date: Oct. 28, 2015

(87) PCT Pub. No.: WO2014/187933
PCT Pub. Date: Nov. 27, 2014

(65) Prior Publication Data
US 2016/0069322 A1    Mar. 10, 2016

(30) Foreign Application Priority Data

May 24, 2013   (BE) .................................. 2013/0364

(51) Int. Cl.
*F03D 7/02* (2006.01)
*F03D 1/06* (2006.01)

(52) U.S. Cl.
CPC ......... *F03D 7/0224* (2013.01); *F03D 1/0608* (2013.01); *F03D 1/0666* (2013.01);
(Continued)

(58) Field of Classification Search
CPC .... F03D 1/0608; F03D 1/0666; F03D 1/0675; F03D 7/0224
See application file for complete search history.

(56) References Cited

U.S. PATENT DOCUMENTS 4,183,715 A * 1/1980 Ducker ................. F03D 7/0224
                                                        416/104
9,017,034 B2 * 4/2015 Fuglsang ............... F03D 1/0658
                                                         416/11
(Continued)

FOREIGN PATENT DOCUMENTS

CN   101235795 B   6/2010
CN   201810482 U   4/2011
(Continued)

OTHER PUBLICATIONS

International Search Report for corresponding International PCT Application No. PCT/EP2014/060604, dated Nov. 27, 2014.

*Primary Examiner* — Igor Kershteyn
*Assistant Examiner* — Brian P Wolcott
(74) *Attorney, Agent, or Firm* — Workman Nydegger

(57) ABSTRACT

A rotor assembly for a wind turbine is provided. The rotor assembly includes a central hub with a central rotation axis, and a plurality of vanes. Each of the vanes is attached to the central hub, and each of the vanes includes in part a cable system which cooperates with each respective vane and the central hub. The cable system includes a pair of cables. Both of the cables are aligned with the longitudinal axis of the respective vane, viewed along the central rotation axis. And both of the cables are on either side of a plane covered by the longitudinal axis of the respective vane. The plurality of vanes are only structurally interconnected via the central hub, and the cable system of each of the vanes has only one single pair of cables.

19 Claims, 9 Drawing Sheets

(52) U.S. Cl.
CPC ........ *F03D 1/0675* (2013.01); *F05B 2240/30* (2013.01); *F05B 2240/302* (2013.01); *F05B 2260/79* (2013.01); *Y02E 10/721* (2013.01)

(56) References Cited

U.S. PATENT DOCUMENTS

2009/0208337 A1    8/2009  Chambers et al.
2010/0086407 A1    4/2010  Holmoy
2012/0051914 A1    3/2012  Dehlsen et al.

FOREIGN PATENT DOCUMENTS

DE         19606359 A1    8/1997
EP          2112372 A1   10/2009
WO       2013007359 A1    1/2013

* cited by examiner

ROTOR ASSEMBLY FOR A WIND TURBINE COMPRISING A PAIR OF CABLES

BACKGROUND

The invention relates to a wind turbine, more specifically to a rotor assembly for a wind turbine.

Wind turbines are often used to generate electrical energy from electrical energy by converting the kinetic energy of the wind. A wind turbine comprising a horizontal shaft comprises a tower, a stator and a rotor assembly with a plurality of vanes. The rotor assembly is mounted in the pod by means of a shaft which is directly or indirectly connected to a generator for generating electrical energy.

A known wind turbine is described in US2009/0208337, which discloses a wind turbine with a rotor assembly. Said rotor assembly comprises a central hub with a central rotation axis and a plurality of vanes, each of which is attached to the central hub by its central end and the longitudinal axis of which extends substantially radially with respect to the central rotation axis up to their radial end. The vanes comprise a two-part structure with an intermediate point situated between the central end and the radial end. The vanes comprise a central vane part which extends from the central end to this intermediate point. Furthermore, the vanes also comprise a radial vane part which is attached to the central vane part and extends from the intermediate point to the radial end of the vane. Furthermore, this rotor assembly comprises a cable system which cooperates with the vanes and the central hub. Both vane parts have a wing shape and particularly the wing shape of the central vane part results in a risk of interference with the cable system, in particular the pair of cables of each vane which is situated between the intermediate point and the central hub. In addition, the intermediate points of the various vanes are also connected to each other by means of a cable. This connection causes undesirable peak loads resulting from interference of deformations and vibrations of the various vanes in the plane of rotation of the vanes.

Another such wind turbine is known from CN101235795B, which discloses a wind turbine with a rotor assembly comprising a central hub 1, with a tapered pipe flange Z from which vanes extend radially comprising a two-part structure as explained above with a central vane part A and a radial vane part B attached at an intermediate point C1. Each of these vane parts A and B is shaped as a wing. In addition, the intermediate points of the various vanes are also connected to each other by means of a big ring C shown in FIG. 1 in dot striped lines. This increases the complexity and the weight of the rotor assembly. This connection also causes undesirable peak load resulting from interference of deformations and vibrations of the various vanes in the plane of rotation of the vanes. The cable system of CN101235795B comprises three cables 2, 3, 4 per vane. These cables being attached between vane attachment points at the intermediate point C1 and hub attachment points at the location of the central hub 1 and its tapered pipe flange Z. These three cables 2, 3, 4 are aligned with the longitudinal axis of their vane, viewed along the central rotation axis. Two of these three cables 3, 4 are on either side of the plane covered by the longitudinal axis of their vane. The tapered pipe flange Z and the third cable attached increases complexity of the construction of the central hub 1, and furthermore when used in an off-wind setup in which the rotor assembly is situated downstream of the mast along the wind direction during operation, cable 4 is the one exposed to the highest load as it is exposed to a tension load, while the cables 2 and 3 are exposed to a pressure load which reduces the load in these cables.

Another such wind turbine is known from DE19606359, this mechanism uses a linkage system of which the linkages are connected at one end to the rotor at approximately the same point where the vane is connected to the rotor; and the linkages are connected at their other end to the wing of the vane. This does not allow the use of a vane comprising a wing rotatable along the longitudinal axis of the vane. It further causes the risk of generating large torsional forces at the connection points of the vane and the linkage system.

It is known from WO13007359A1 produce a wing for use in such a windturbine by means of an extrusion process which makes use of a rotating extrusion die or of a subsequent twisting operation to provide a wing with a twisted shape along the longitudinal direction of about 3 to 5 degrees per meter. However the use of such a rotating extrusion die complicates the extrusion process and a subsequent twisting operation does not always result in a sufficiently uniform twist along the entire length of the wing.

SUMMARY

As a result thereof, there is a need for a rotor assembly for a wind turbine which overcomes the abovementioned drawbacks and more particularly a rotor assembly for a wind turbine comprising vanes with an improved cable system so that the vanes can be made in a simpler manner and so as to be more lightweight and with a reduced risk of the cable system interfering with the wing shape of the vane or of undesirable vibrations occurring due to interference of various vanes in the cable system. Additionally there is a need for an improved manufacturing process for wings suitable for use in such wind turbines.

According to a first aspect of the invention, rotor assembly for a wind turbine comprising,
 a central hub with a central rotation axis; and
 a plurality of vanes, each attached to the central hub by its central end and each extending from its central end up to its radial end along a longitudinal axis substantially radially with respect to the central rotation axis, and each comprising:
 an intermediate point situated between the central end and the radial end;
 a central vane part which extends from the central end to the intermediate point;
 a radial vane part which is attached to the central vane part and extends from the intermediate point to the radial end of the vane, only the radial vane part comprising a wing having a shape which is suitable to be driven by the wind; and
 a cable system which cooperates with the vane and the central hub, the cable system comprising a pair of cables per vane, both cables of which are attached between vane attachment points at the location between the central end and the radial end and hub attachment points at the location of the central hub, both these cables being fitted in such a manner that:
 both these cables are aligned with the longitudinal axis of their vane, viewed along the central rotation axis; and
 CHARACTERIZED IN THAT
 the plurality of vanes are only structurally interconnected via the central hub and the cable system consists of one single pair of cables per vane.

The rotor assembly according to the invention allows the surface covered by the wing shape to be increased in which the specific geometry of the cable system allows for a simple and lightweight construction of the vanes. This is achieved by a specific construction of the rotor assembly in which the cable system optimally reduces the load on the central vane part. In addition, vibrations and deformations of individual vanes are no longer passed on to the other vanes, so that undesirable peak loads due to interference of such phenomena are avoided. In addition, this offers the possibility of limiting the maximum length of the individual components of the rotor assembly, which is advantageous during transportation.

It is clear that in this way the rotor assembly does not comprise any further elements forming a direct structural connection between two of said plurality of vanes at a location other than their central end.

Thereby each of the vanes is isolated from each other in a way that peak loads which could result from opposing deformations of the individual vanes in the plane of rotation of the longitudinal axis of the vanes are prevented.

Preferably, for each vane, the distance from the longitudinal axis of the vane to the vane attachment points is smaller than the distance from the longitudinal axis of the vane to the hub attachment points.

In this way, deformations of the central vane part in the direction of the rotation axis of the rotor assembly can be absorbed efficiently, with a cable system that only has a minimal impact on air resistance of the rotor assembly.

According to an embodiment the central vane part comprises a tube extending along the longitudinal axis of the vane; and the radial vane part comprises a tube extending along the longitudinal axis of the vane, the tube of the radial vane part being adapted to be fitted to the tube of the central vane part.

This makes it possible to produce the rotor assembly using components that are simple to produce.

According to a further embodiment the tube of the radial vane part is fitted to the tube of the central vane part at the location of the intermediate point.

This way all mounting means for the cable system and the vane parts are located at approximately the same location along the longitudinal axis of the vane which facilitates the mounting operation.

According to a further embodiment the wing is rotatably attached to the tube of the radial vane part.

This allows for an optimized positioning of the wing depending on for example the wind speed and the rotational speed of the rotor assembly during use.

According to a further embodiment the wing, comprises an internal cavity, extending along the longitudinal axis of the vane, into which the tube of the radial vane part can be introduced, such that said wing is rotatably attached to the tube of the radial vane part.

This allows for a simple and secure rotatable connection of the wing to the tube of the radial vane part.

According to an embodiment, the central vane part comprises a tube. Preferably, the radial vane part comprises a tube which can be fitted to the tube of the central vane part at the location of the intermediate point and to which the wing is attached. According to another preferred embodiment, the wing is rotatably attached to the tube of the radial vane part. Preferably, the wing, along the longitudinal axis of the vane, comprises an internal cavity into which the tube of the radial vane part can be introduced.

This makes it possible to produce the rotor assembly using components that are simple to produce.

According to a further embodiment both cables are attached at vane attachment points at an intermediate attachment location in between the intermediate point and the radial end. Preferably the vane attachment point is located on the tube of the radial vane part: and the wing comprises for each of the cables an opening through which the cable extends to the vane attachment point, the opening being dimensioned such that it allows for a predetermined degree of rotation of the wing. Preferably at least one of the cables is attached to the tube of the radial vane part by means of a vane attachment connector adapted to interact with the opening such that the degree of rotation of the wing is limited to the predetermined degree of rotation of the wing.

In this way interference of the wing with the cable system is minimized, while there is no longer a need for the use of additional stops or similar elements for limiting the range of rotational movement such that it does not exceed allowable limits during use.

According to a further embodiment both cables are attached at vane attachment points at the location of the intermediate point. Preferably the vane attachment points are located on one of the tubes at a location which is not covered by the wing.

Such a location for the vane attachment points is advantageous as it provides for attachment points that inherently limit the possibility of interference with the wing and can be provided in a simple way.

Preferably the central vane part has a length in the range of 20% to 200% of the length of the radial vane part, for example in the range of 40% to 150%, preferably 45% to 100%, for example 50%.

Such a range of relative lengths allows for a suitable reduction of the length of the vane when the vane parts are in their disconnected state, which is advantageous during transportation of the rotor assembly.

Preferably, the vane comprises a positioning mechanism and a control device which is coupled thereto and which, upon activation, is configured to adjust the position of the wing; and the wing is formed and/or fitted in such a way that the wing turns out of the wind upon deactivation of the control device.

According to an embodiment, the positioning mechanism and the control device coupled thereto are configured such that they turn the wing out of the wind when a predetermined speed of rotation of the rotor assembly is exceeded.

This makes it possible to protect the rotor assembly against overload.

According to an embodiment, the positioning mechanism comprises a hydraulic actuator and the control device which is coupled thereto comprises a hydraulic circuit.

According to a further embodiment, the positioning mechanism and/or the control device coupled thereto are fitted in the rotor assembly, the control device further comprising:

an energy supply which is configured to be charged by means of an electric generator which is fitted to the rotor assembly or by a stationary energy source by means of wireless transfer of energy; and/or wireless communication module which is configured to make wireless communication possible between the control device and a stationary control device.

This makes it possible to fit and actuate the actuators of the rotor assembly in a simple manner without complicated mechanical transmissions.

According to an embodiment, the wing is produced as an extruded profile.

In this way, the rotor assembly according to the invention can use a wing which is simple to produce.

According to a second aspect of the invention there is provided a method of manufacturing a wing for use in a rotor assembly according to a first aspect of the invention, in which the wing is produced as a twisted extruded profile, that is twisted about its longitudinal axis said twisted extruded profile has a degree of twist per meter of length of the wing in the range of 0.5° to 5°, for example 3° characterised in that, the twisted extruded profile is manufactured by means of an extrusion process making use of a twisted extrusion die channel with predetermined degree of twist per meter of length of the die channel along its longitudinal axis, in the range of 1° to 5°, for example 3°.

In this way a wing can be manufactured allowing for a rotor assembly with an increased wind energy conversion efficiency, by means of an advantageous manufacturing process without increasing complexity of the manufacturing process as only a suitably constructed die channel needs to be fitted to the extruder, which will result in in a more uniform degree of twist along the longitudinal axis when compared with an extrusion process using a rotatable dye as there is no longer a risk for variations in the extraction speed of the extruded profile versus the rotational speed of the die. The degree of twist is solely determined by the twisted shape of the die and will thus be substantially uniform along the entire length of the extruded wing. Additionally such a twisted die channel will cause a more advantageous level and distribution of residual stresses within the extruded profile thus resulting in an extruded wing with advantageous mechanical properties for withstanding the stresses to which it will be subjected during operation in a rotor assembly of a windturbine.

According to a third aspect of the invention there is provided a wind turbine comprising a rotor assembly according to the first aspect of the invention, characterized in that the wind turbine furthermore comprises:
- a pod to which the rotor assembly is attached so as to be rotatable along the essentially horizontal rotation axis;
- a mast having an essentially vertical longitudinal axis to which the pod is attached so as to be rotatable along an essentially vertical rotation axis by means of a bearing system.

According to a further embodiment, the bearing system comprises at least two bearings, the rotation axis of which coincides with the essentially vertical rotation axis and which are fitted at various locations along the essentially vertical longitudinal axis of the mast. Optionally, the bearings of the bearing system are conical bearings. According to still further embodiments the bearing system comprises one or more slewing bearings.

Such a construction makes it possible to absorb both the radial and the axial load of the pod on the mast in an efficient manner without the need for a bearing with a large diameter.

BRIEF DESCRIPTION OF THE DRAWINGS

The invention will now be described in more detail with reference to the figures in which.

DETAILED DESCRIPTION OF VARIOUS EMBODIMENTS

Figure 1:
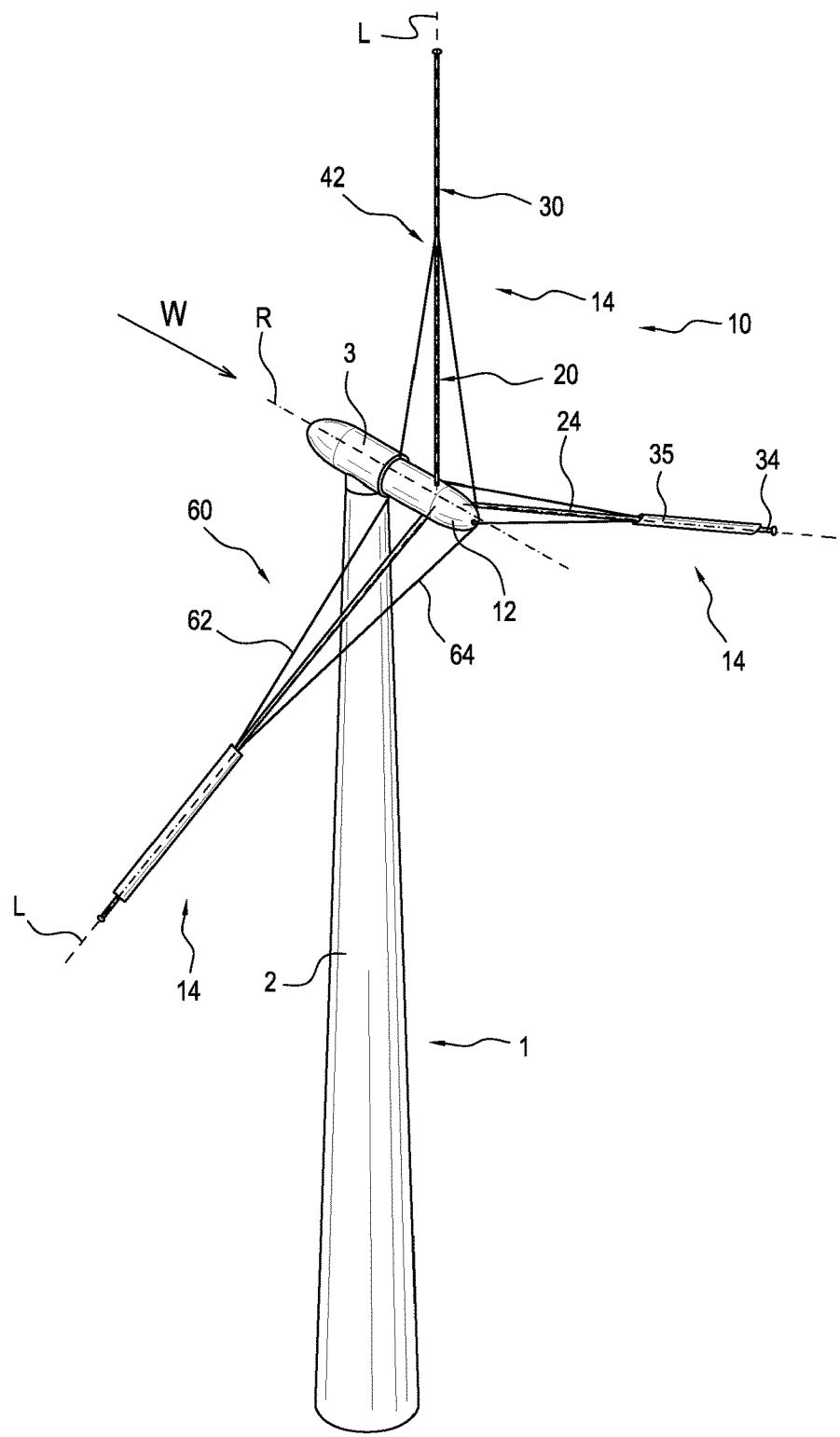
FIG. 1 shows an embodiment of a wind turbine according to the invention.

FIG. 1 shows an embodiment comprising a wind turbine 1 with a rotor assembly 10 according to the invention. It relates to a horizontal-axis wind turbine 1 comprising a pod 3 which is fitted so as to be rotatable about an essentially vertical rotation axis on a mast or tower 2. The rotor assembly 10 itself is rotatably fitted in the pod to rotate about an essentially horizontal central rotation axis R. The rotor assembly 10 is arranged "downwind", meaning according to the wind direction W at the back of the pod 3 during operation. Such an arrangement has the advantage that no additional mechanism is necessary to keep the rotor assembly 10 in the wind. According to an alternative embodiment, the rotor assembly 10 can also be arranged "upwind", for example in order to prevent the disadvantageous effects of the turbulence at the rear of the tower, but this requires an additional mechanism in order to keep the rotor assembly in the wind, such as for example a weather vane or a wind sensor in combination with a servomotor.

The rotor assembly 10 is rotatable about an essentially central horizontal rotation axis R and comprises a central hub 12, the central axis of which coincides with the central horizontal rotation axis R. Three vanes 14 are attached to this central hub. It is clear that, according to alternative embodiments, a different plurality of vanes may be fitted, such as for example two, four, five, . . . . The vanes 14 are attached to the central hub 12 by their central end 22 and extend along their longitudinal axis L, essentially radially with respect to the central rotation axis R, up to their radial end 32.

Figure 2:
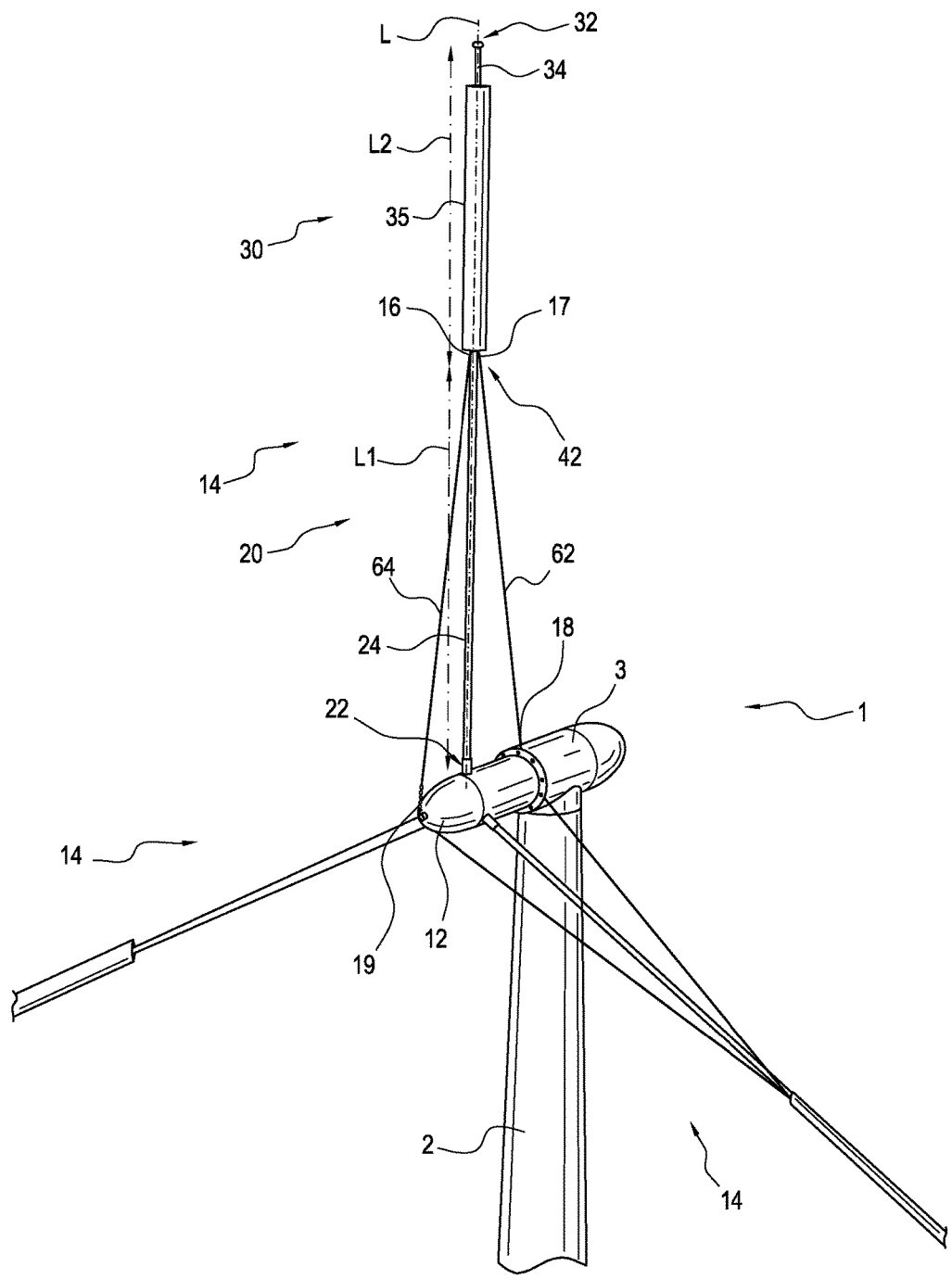
FIGS. 2 and 3 show a partial representation of the rotor assembly of the wind turbine from FIG. 1.
Figure 3:
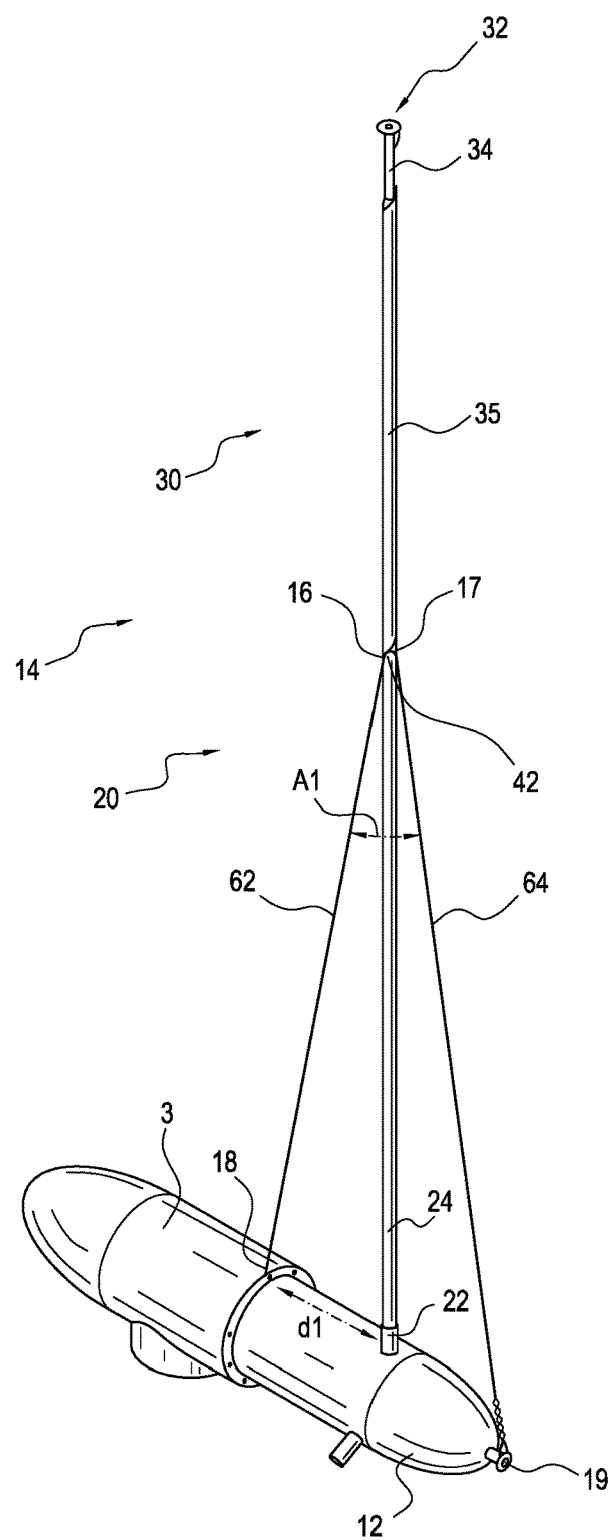

As illustrated in FIG. 1 and also in more in detail in FIGS. 2 and 3, these vanes 14 each comprise an intermediate point 42 situated between the first central end 22 and the second radial end 32.

The vane 14 is divided into two vane parts 20, 30, that is to say that the vane 14 comprises a central vane part 20 which extends from the first central end 22 to the intermediate point 42. To this first central vane part 20, which according to this embodiment is configured as a tube 24, a second radial vane part 30 is then attached. This radial vane part 30 extends from the intermediate point 42 to the second radial end 32. The longitudinal axes L of the two vane parts 20, 30 virtually converge here. As can be seen, according to this embodiment this second radial vane part 30 consists of a tube 34 which is attached to the tube 24 of the first central vane part 20 at the location of the intermediate point 42. A wing 35 which is shaped such that it can be driven by the wind is fitted around this tube 34 of the radial vane part 30. This wing 35 may be fixedly attached to this tube 34, but according to a preferred embodiment this wing 35 is rotatably mounted on this tube 34 so that it can be turned to different positions by means of an actuator 72, as will be discussed below with reference to FIGS. 4A-C. Separating the vane 14 into two parts is advantageous because in this way the vane 14 can be more readily transported in the disassembled state. In addition, this also makes it possible to produce the wing 35 using a profile which is easy to produce, for example an aluminium or plastic extruded profile. An embodiment of such a profile for the wing 35 is illustrated, for example, in FIGS. 4A-C, in which the wing 35 comprises an internal cavity 38 along the longitudinal axis L of the vane 14 into which the tube 34 of the second radial vane part 30 can be introduced.

In addition, each of these vanes 14 also comprises a cable system 60 which cooperates with the vane 14 and the central hub 12. This cable system 60 ensures that deformation of the vane 14 is counteracted. This deformation relates to deformation by load on the vanes 14 along the direction of the central rotation axis R. To this end, the cable system 60 contains one single pair of cables per vane 14 comprising a first cable 62 and a second cable 64. These two cables 62, 64 are in each case attached between attachment points 16, 17 at the location of the intermediate point 42 and attachment points 18, 19 at the location of the central hub 12. As can be seen, these two cables 62, 64 are aligned with the longitudinal axis L of their vane 14, viewed along the central rotation axis R. These two cables 62, 64 are furthermore also on either side of the plane which is covered by the longitudinal axis L of their vane 14. In other words, one of the cables 62 of the pair of cables is fitted "upwind", while the other cable 64 of the pair of cables is fitted downwind. Both cables of the pair of cables are thus situated on either side of the plane which is covered by the longitudinal axis L of the vane 14 during a rotation about the central rotation axis R.

As is illustrated in FIG. 2, the attachment points 16, 17 are arranged on the tube 24 of the central vane part 20, at the location of the intermediate point 42. According to a variant embodiment, the attachment points may be arranged on, for example, the tube 34 of the radial vane part 30 in a similar way near the longitudinal axis L. In this case, it is important that the distance from the longitudinal axis L of the vane 14 to the attachment points 16, 17 is smaller than the distance dl from the longitudinal axis L to the corresponding attachment points 18, 19. Consequently, both cables 62, 64 form an angle A1. The smaller this angle A1 is, the greater the forces are which will develop in the cables 62, 64 as a result of loads on the vane 14 at right angles to the plane covered by the longitudinal axis L. Such loads can be created as a result of the load of the wind on the vanes 14. As is furthermore visible in FIGS. 2 and 3, the cables are provided with known cable tensioners at the location of the attachment points 16, 17, 18 and/or 19 in order to be able to adjust the tension of the cables 62, 64 in such a way as to provide the desired stiffness to the central vane part 20, without requiring complicated profiles for the tube 24 or materials having a very high degree of stiffness. The tube 24 may, for example, be made from a suitable metal, such as for example steel or aluminium. In this way, a simple and lightweight construction of this central vane part 20 is made possible.

As can be seen in FIGS. 1-3, only the radial vane part 30 is provided with a wing 35. This is advantageous, as the power which is generated by the rotor assembly 10 is proportional to the surface which is covered by the wings of the vanes 14. Thus, due to the fact that the wings 35 are arranged at a certain distance from the central hub 12, a rotor assembly 10 as illustrated in FIGS. 1-3 may cover a larger surface for a certain wing length L2 if the distance to the central rotation axis R increases. As a result thereof, an optimal distance L1 of the central rotation axis R to the intermediate point 42 can be chosen. Furthermore, this also enables using a wing 35 with a profile which is easy to produce, since the part of the wing 35 which is situated further away from the rotation axis R requires a less complicated shape than the part which is situated closer to the rotation axis if the same level of efficiency is to be achieved. In addition, it is also advantageous for transportation of the rotor assembly 10 if the length L2 of the radial vane part 30 and the length L1 of the central vane part 20 remain within certain legal limits. Thus, the length L1 and L2 may be, for example, approximately 6 or 12 metres, so that they can be transported by means of standard containers. Upon installation, both vane parts 20, 30 can then be connected to each other by means of suitable attachment members, such as for example bolts or a clamping connection at the location of the intermediate point 42.

Furthermore, according to the embodiment shown in FIGS. 1-3, the cable system 60 comprising a pair of cables with two cables 62, 64 per vane 14 as described above also gives optimum results with regard to minimizing additional air resistance of the rotor assembly 10, as more cables or additional elements, such as for example spreaders for the cables, in each case cause additional air resistance. In addition, possible interference with the wing 35 is prevented as the pair of cables is arranged between the intermediate point 42 and the central hub 12.

If the wing 35 is fitted in a fixed position, for example fixed on the tube 34, then the components of the vane 14 have to be dimensioned in such a manner that they can withstand the highest possible load which can be caused by the wind. In order to reduce the maximum load on the components of the vane 14 and consequently to be able to produce a more lightweight and simpler construction, it is preferred to attach the wing 35 on the tube 34 of the second radial vane part 30 so as to be rotatable. In this way, the wing 35 can be turned out of the wind in case of impending overload, that is to say can be turned to a position about the longitudinal axis L of the vane 14 where the impact of the wind is minimal. For the embodiment illustrated in FIGS. 1-3, the wing 35 along the longitudinal axis L of the vane 14 is to this end provided with an internal cavity 38 into which the tube 34 of the second radial vane part 30 can be introduced, and to which the wing 35 is rotatably attached by means of a suitable bearing.

Figure 4A:
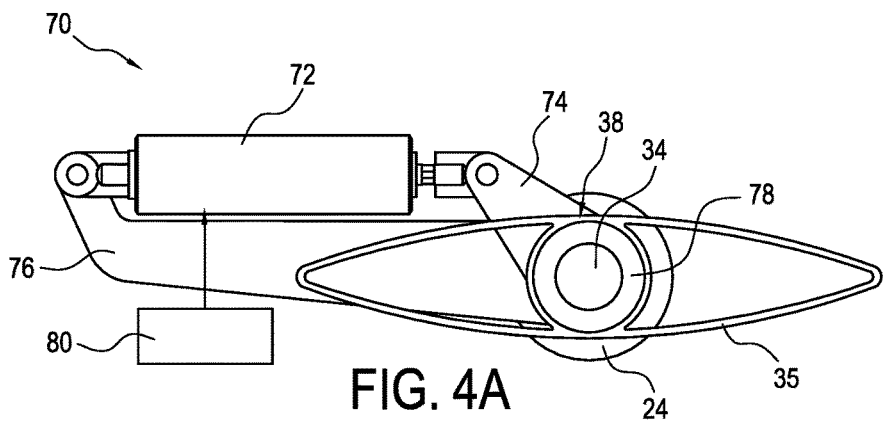
FIGS. 4A-C and 5 show an embodiment of a positioning mechanism for the vanes.
Figure 4B:
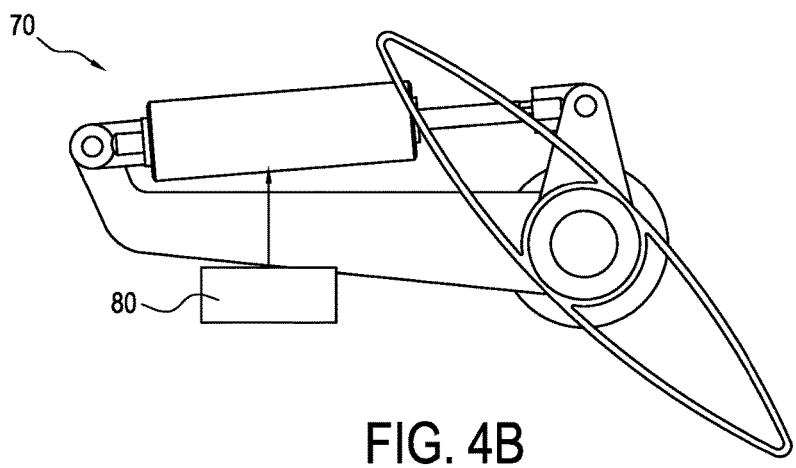
Figure 4C:
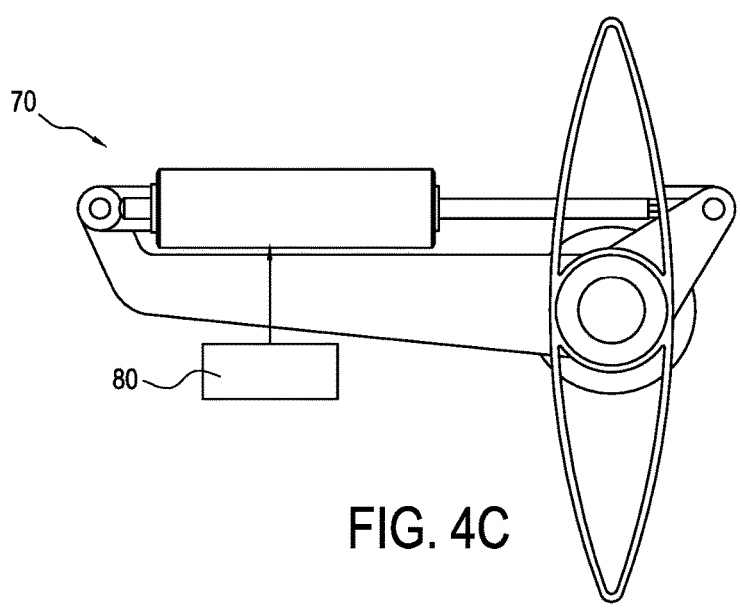

An embodiment of a positioning mechanism 70 and a control device 80 coupled thereto is diagrammatically illustrated in FIGS. 4A-C. The positioning mechanism 70 is configured as a hydraulic actuator 72, for example a single-acting hydraulic actuator 72 with built-in return spring, but according to alternative embodiments this may also be an electric, pneumatic or any other suitable type of actuator. On one side, the hydraulic actuator 72 is connected to the tube 34 of the radial vane part 30 via an arm 76, which is arranged, for example, at the location of the intermediate point 42. On the other side, the actuator 72 is connected to the wing 35 via an arm 74. The actuator 72 is thus able to determine the position of the wing 35 which is fitted to the tube 34 of the radial vane part 30 so as to be rotatable by means of a bearing 78.

FIG. 4B shows the wing 35 in its starting position. In this position, the wind has a sufficiently great impact on the wing 35 so that sufficient torque can be generated to be able to set the rotor assembly 10 in motion from a standstill. In this case, the wing 35 is at a well-defined angle of incidence with respect to the relative wind direction. This angle of incidence of the wind direction ensures that a starting torque is generated which is as large as possible. Once the rotor assembly 10 has been brought up to speed from a standstill, the actuator 72 can be actuated by the control device 80 in such a manner that the wing 35 is moved to the position illustrated in FIG. 4A. In this position, the wing is placed substantially transversely to the wind direction in order to thus find a better balance between the force generated by the wind on the wing and the air resistance which the wing 35 experiences during rotation of the rotor assembly 10 during normal operation of the wind turbine 1. Finally, FIG. 4C shows the wing 35 in a position which is assumed upon deactivation of the wind turbine, for example in order to prevent overloading at excessive wind speeds or for maintenance purposes. In this position, the wing 35 is substantially aligned with the wind direction, so that the torque generated by the rotor assembly 10 is reduced. In order to ensure safe operation of the rotor assembly 10, the wing 35 is shaped in such a way that, or is provided with means, such as springs, actuators or other elements which ensure that, upon deactivation of the control device 80, the wing 35 is turned out of the wind, they assume the position as illustrated in FIG. 4C. In case a predetermined speed of rotation of the rotor assembly 10 is exceeded, which may for example be determined by means of a suitable angular rotation sensor or by means of elements which are actuated by a centrifugal force, the wing 35 is also turned to the position illustrated in FIG. 4C in order to prevent overloading of the rotor assembly 10.

Figure 5:
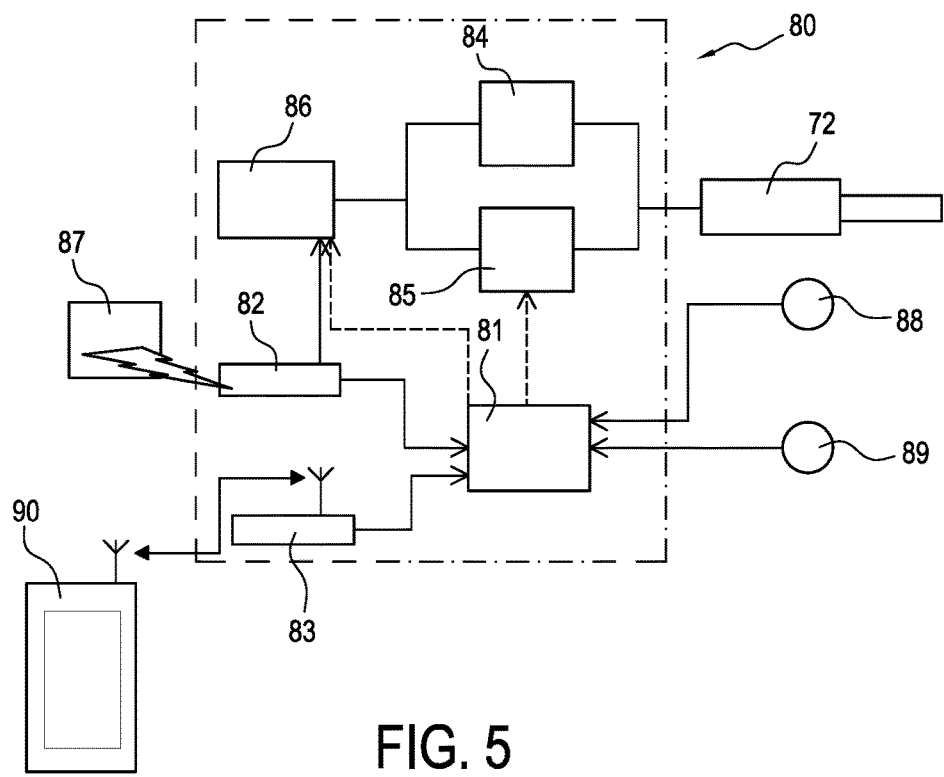

FIG. 5 shows an embodiment of a control device 80 for the actuator 72 illustrated in FIGS. 4A-C. This control device 80 comprises, for example, a hydraulic circuit 84, 85, 86 with hydraulic components, optionally supplemented by an electronic processing unit 81 and suitable energy supplies and/or energy sources 82, 86. Furthermore, the control device is coupled to suitable sensors 88, 89 in order, for example, to determine the speed of rotation of the rotor assembly 10 or the position of the wings 35. The hydraulic circuit 84, 85, 86 is actuated in such a way by the electronic processing unit 81 that the position of the actuator 72 is controlled depending on the speed of rotation of the rotor assembly 10 or on the basis of settings by an operator, for example to make it possible to carry out maintenance on the wind turbine 1. To this end, the hydraulic circuit comprises a suitable energy source 86 with a supply of hydraulic liquid, such as a hydraulic pressure vessel or an accumulator combined with, for example, a suitable hydraulic pump which is able to supply the hydraulic liquid to or discharge it from the actuator 72. Furthermore, the hydraulic circuit comprises, for example, a centrifugal valve 84 which, depending on the speed of rotation of the rotor assembly 10, actuates the actuator 72 when the maximum permissible speed of rotation is exceeded to deactivate the wings 35 by moving them to the position illustrated in FIG. 4C. In addition, the hydraulic circuit also comprises an electrically actuated valve 85. This valve 85 is actuated in such a manner that hydraulic liquid is supplied to or discharged from the actuator 72, so that the actuator 72 moves the wing 35 into the desired position or keeps it in the desired position. The valve 35 is actuated by an electronic processing unit 81 which, for example, will automatically determine the correct position of the actuator 72 by means of valve 85, on the basis of the data from sensors, such as for example an angular rotation sensor 88 which detects the position of the wing 35 and an angular rotation sensor 89 which records the speed of rotation of the rotor assembly 10. As mentioned above, the electronic processing unit 81 may also be actuated by means of instructions from an operator, for example to deactivate the wings 35 so that the rotor assembly 10 can easily be brought to a standstill in order to facilitate maintenance operations. The electronic processing unit 81 is provided with current by means of an electrical energy supply 82, such as for example a suitable battery or a capacitor. This electrical energy supply 82 may in turn supply energy to the hydraulic energy source 86, for example to the hydraulic pump.

Preferably, not only the positioning mechanism 70, but also the control device 80 which is coupled thereto is arranged in the rotor assembly 10. This means that all the necessary means for the operation of the positioning mechanism 70 are also fitted to the rotor assembly 10, for example in the wing 35 or on the vane 14 or in the central hub 12. In this case, the electrical energy supply 82 will rotate along with the rotor assembly 10. In order to charge this energy supply 82, it is then possible, for example, to use wireless energy transfer. This may, for example, be implemented, as is illustrated in FIG. 5, by means of an inductive coupling between the electrical energy supply 82 which is fitted on the rotor assembly 10 and a stationary electrical energy source 87, for example an inductive battery charging station which is arranged in the pod 3 or in the mast 2. According to an alternative embodiment, the energy supply 82 can be charged by means of a dynamo or alternator or another suitable electric generator which is also fitted in the rotor assembly. The electric generator is arranged in the rotor assembly in such a manner that the rotation of the rotor assembly 10 is converted into a rotation of the electric generator in order to thus generate electrical energy which can be added to the electrical energy supply 82. This may, for example, be achieved by fitting the stator of the electric generator in the rotor assembly 10 and by coupling the rotor of the electric generator to the pod 3, so that, during the rotation of the rotor assembly 10, the rotor of the electric generator rotates with respect to its stator which moves concomitantly with the rotor assembly 10. In order to enable communication between the control device 80 which is present in the rotor assembly 10 and other control devices 90 which are fitted in a stationary manner, for example a control device of the wind turbine which is present in the tower 2 or the pod 3 or a service terminal for use by an operator, known systems for wireless data communication can be used. To this end, the control device 80 which is arranged in the rotor assembly comprises a wireless communication module 83, for example a Wi-Fi, mobile, Bluetooth or other suitable module which enables wireless communication with a stationary control device 90. In this way, all elements to ensure optimum functioning of the rotor assembly 10 are arranged on the rotor assembly 10 itself and can be operated without complicated couplings for cables for energy transfer or communication between the rotor assembly 10 and the pod 3 or the mast 2 of the wind turbine 1.

Figure 6:
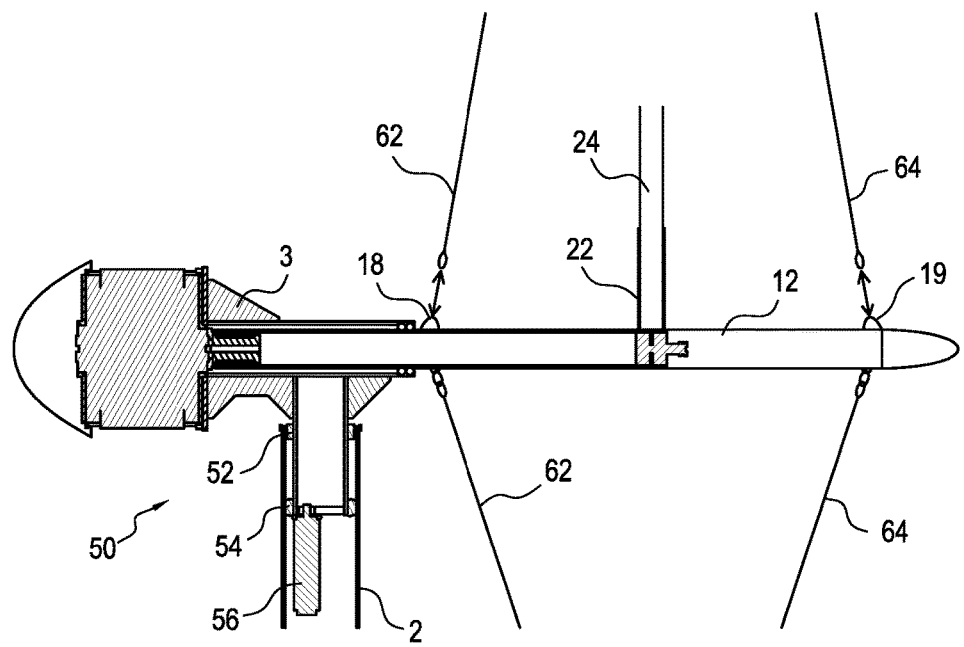
FIG. 6 diagrammatically shows a partial cross section of a variant embodiment of the wind turbine according to the invention.

A variant embodiment of the wind turbine 1 according to the invention is illustrated in FIG. 6. The rotor assembly 10 essentially corresponds to the embodiment illustrated in FIGS. 1-3. The partial cross section from FIG. 6 furthermore shows how the pod 3, to which the rotor assembly 10 is fitted so as to be able to rotate along the essentially horizontal rotation axis R, is itself fitted to the mast so as to be able to rotate. On the mast 2 which has an essentially vertical longitudinal axis, the pod 3 is fitted so as to be able to rotate along an essentially vertical rotation axis by means of a bearing system 50. As can be seen, this bearing system 50 comprises two bearings 52, 54 whose axes of rotation coincide with the essentially vertical rotation axis. These bearings 52, 54 are arranged at various locations along the essentially vertical longitudinal axis of the mast 2. These bearings 52, 54 of the bearing system 50 are for example conical bearings, since such a bearing system 50 is able to absorb the radial and axial load in an efficient manner without requiring bearings of a large diameter. However it is clear that according to alternative embodiments of the bearing system one or more other suitable bearings could be provided, such as for example one or more suitable slewing bearings of sufficient capacity. Finally, a pod-positioning mechanism 56 is also illustrated and consists of an actuator, for example an electrical or hydraulic actuator which cooperates with the mast 2 and the pod 3 and which can be actuated, for example, by means of a suitable control device for bringing the pod 3 and consequently also the rotor assembly 10 into a suitable position with respect to the wind direction.

Figure 7:
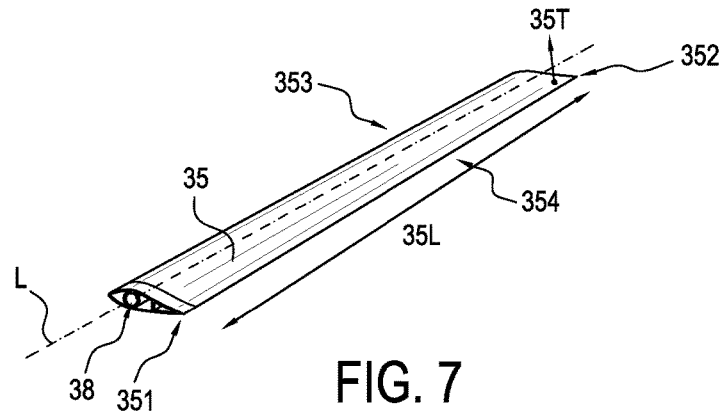
FIGS. 7 and 8 schematically show an embodiment of wing manufactured according to an advantageous manufacturing process.
Figure 8:
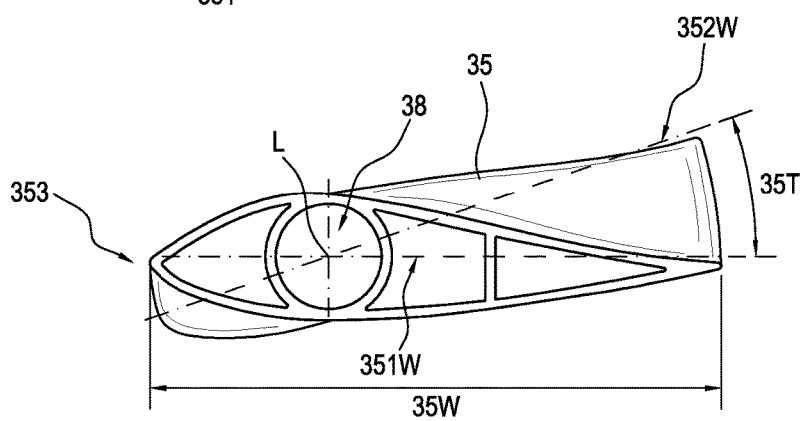

The embodiment of the wing 35 described above with reference to for example FIGS. 4A-4C comprises a straight linear extruded profile. This means that, as shown in FIG. 7, the wing 35 which extends along a longitudinal axis L between a central end 351 and a radial end 352 comprises an upstream end 353 and a downstream end 354 which both run parallel to the longitudinal axis L, this longitudinal axis L forming for example the central axis of the internal cavity 38 of the wing 35. Although such type of wing 35 is simple of construction an improved efficiency of conversion of the wind energy can be attained when such a wing 35 comprises a longitudinal twisted shape, this means as shown in FIG. 7, that the wing 35 along its longitudinal axis L is provided with a predetermined degree of twist per meter of length of the wing 35, this means with a predetermined ratio between the angle of rotation 35T about the longitudinal axis L between the central end 351 and the radial end 352 and the length of the wing 35L. According to one example the length 35L of the wing 35 is for example about 6 m and the angle of rotation 35T is about 20°. This results in a wing 35 with a twisted extruded profile as shown in FIG. 8, of which the central axis 351W, 352W along the width 35W of the wing 35, which is for example 35 cm, is rotated about 20° between the central end 351 and the radial end 352. It is clear that other embodiments of the wing 35 can be produced as a twisted extruded profit, that is twisted about its longitudinal axis (L), as long as in general said twisted extruded profile has a degree of twist per meter of length of the wing 35 in the range of 1° to 5°, for example 3°, 4°, etc. Advantageously the twisted extruded profile of the wing 35 is manufactured by means of an extrusion process making use of a twisted extrusion die channel with predetermined degree of twist per meter of length of the die channel along its longitudinal axis, in the range of 1° to 5°, for example 3° as this enables a uniform degree of twist along the entire length of the wing 35 which can be realised without modifying anything to the conventional extrusion process for manufacturing a straight extruded profile wing but the die channel. It is clear that other suitable lengths, widths and shapes for the wing 35 are possible as long as they allow for manufacturing by means of an extrusion process as described above and preferably their cross section comprises an internal cavity 38 along the longitudinal axis L suitable for introducing a tube of a vane such as for example shown in FIG. 9, as will be explained in more detail below.

Figure 9:
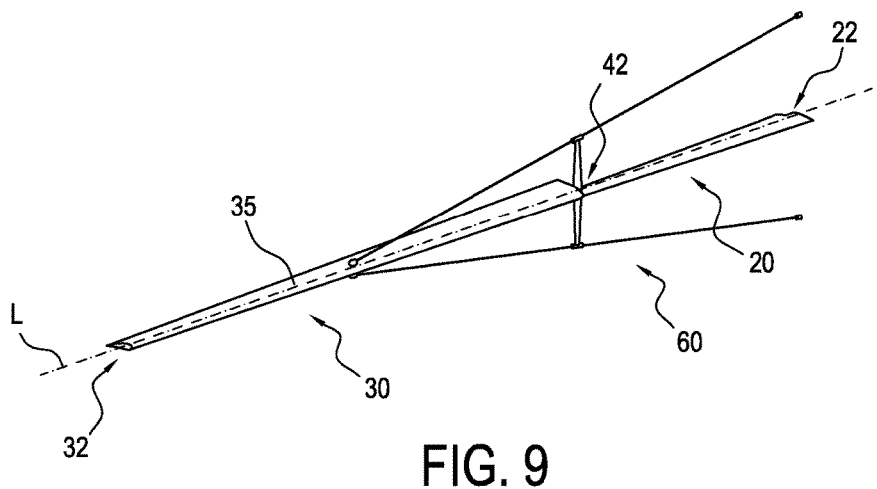
FIG. 9, shows a wing as shown in FIGS. 7 and 8, in use in a vane of an embodiment of the rotor assembly as shown in FIGS. 10-16.
Figure 10:
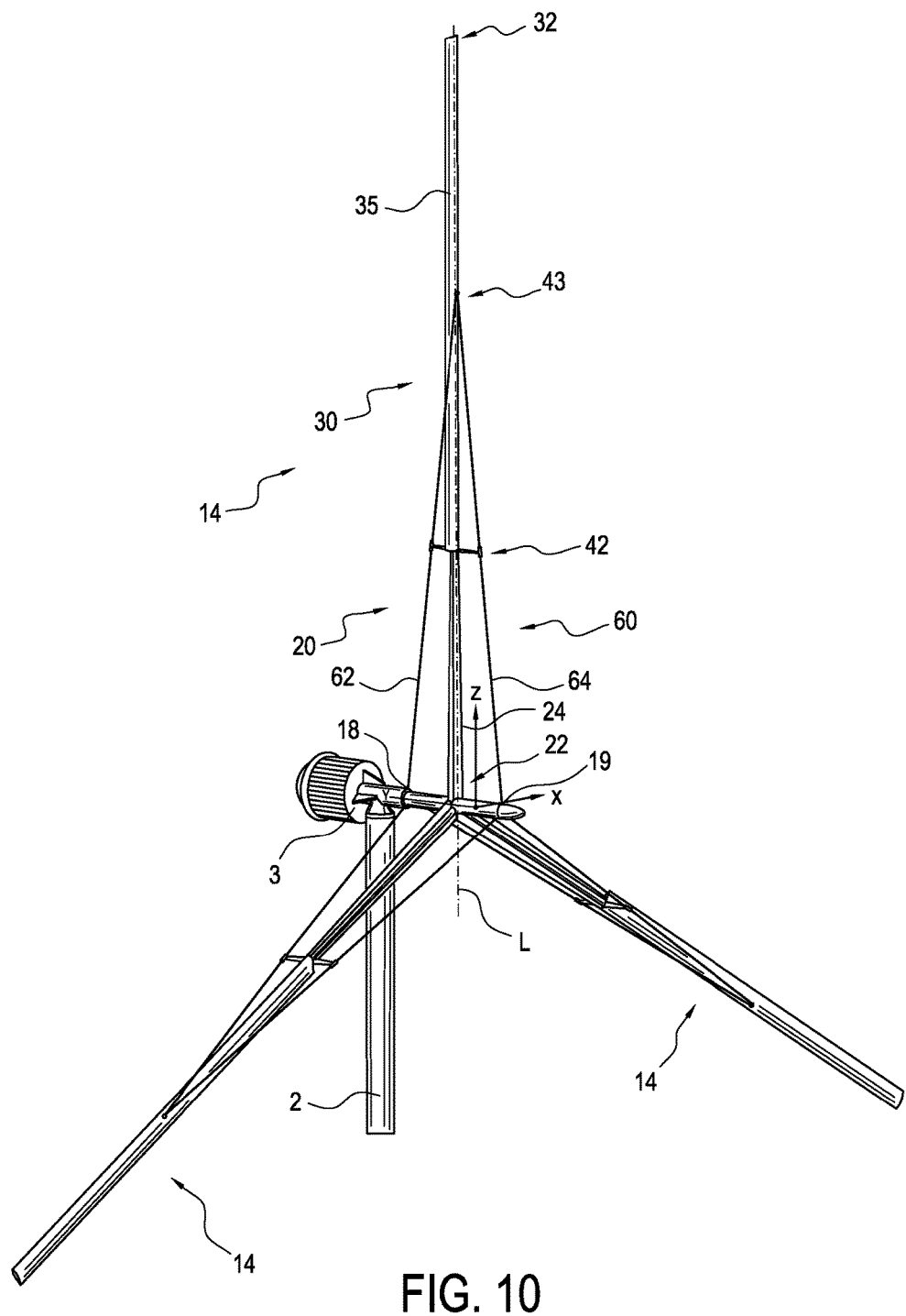
FIGS. 10-14 schematically show a further embodiment of the rotor assembly.
Figure 11:
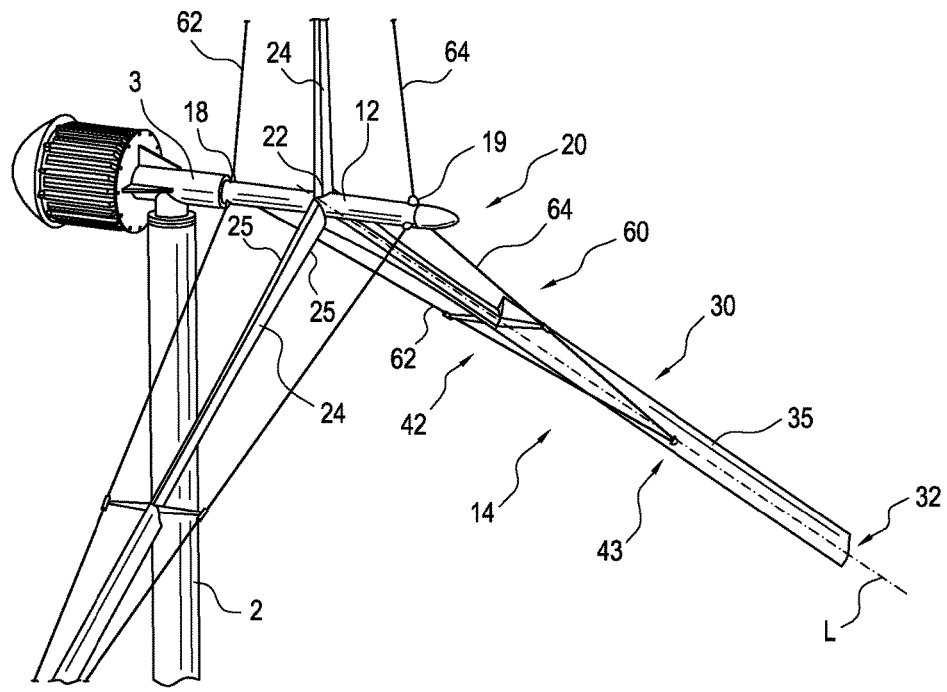
Figure 12:
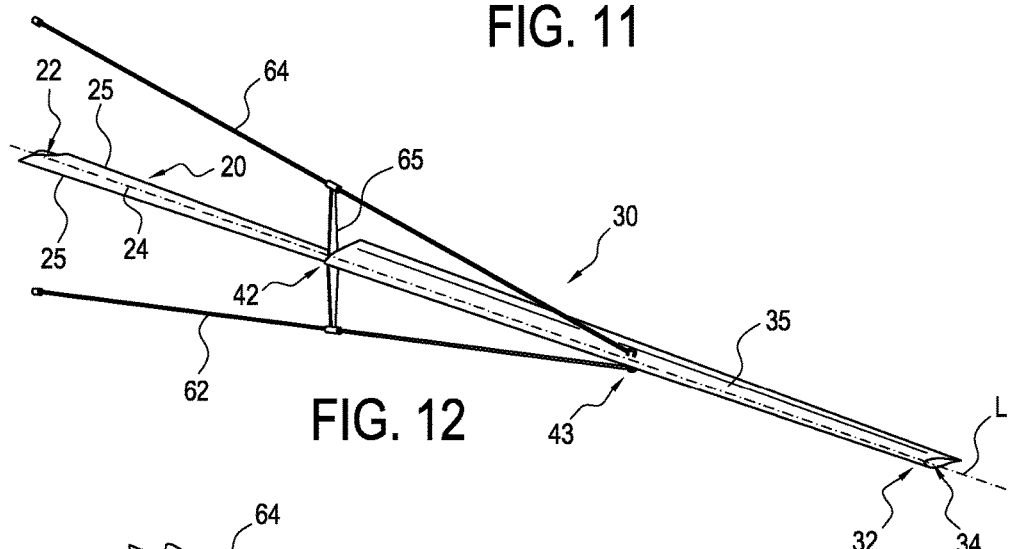
Figure 13:
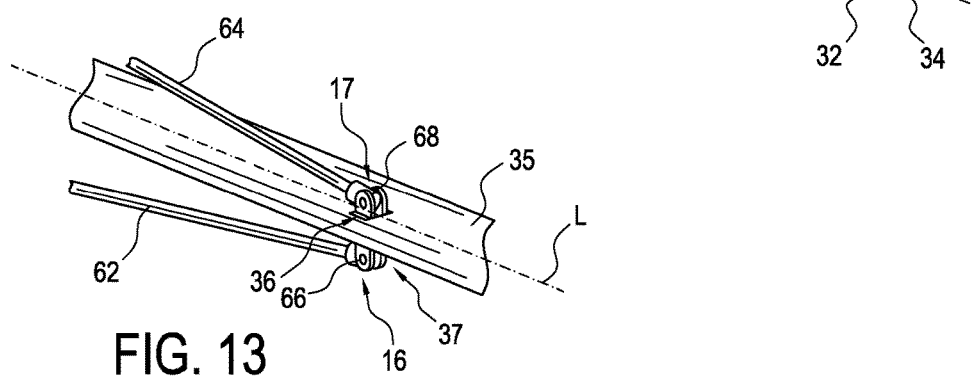

FIG. 10 shows a wind turbine comprising a rotor assembly with vanes according to the embodiment shown in FIG. 9. The construction of this embodiment is largely similar to that of the embodiments described above and similar elements have been identified with the same reference signs. The main difference with the embodiment of FIGS. 1-3 is that both cables 62, 64 are now attached at vane attachment points 16, 17 at an intermediate attachment location 43 in between the intermediate point 42 and the radial end 32. As shown more clearly shown in FIGS. 10-13, the vane attachment point 16, 17 at the intermediate attachment location 43 are located on the tube 34 of the radial vane part 30. As further shown the wing 35 comprises for each of the cables 62, 64 an opening 36, 37 through which the cable system 60 extends to the intermediate attachment location 43 on the tube 34 of the radial vane part 30. It is clear that these openings 36, 37 are dimensioned such that it allows for a predetermined range of rotation of the wing 35 around their longitudinal axis L. When the end of the range of rotation of the wing 35 is reached the opening interacts, with the cable system 60. According to the embodiment shown in FIGS. 10-13, each vane 14 comprises two vane attachment connector 66, 68 that attach the two cables 62, 64 to the tube 34 of the radial vane part 30 at the intermediate attachment location 43. As shown these vane attachment connectors 66, 68 extend at opposite sides of the tube 34, substantially transverse to the longitudinal axis L of the tube 34 through the respective openings 36, 37 in the wing 35. From these attachment connectors 66, 68 form a vane attachment point 16, 17 for the corresponding cables 62, 64 which then extend to their hub attachment point 18, 19. It is clear that such as best shown in FIG. 13, in this way the attachment connectors 66, 68 interact with their corresponding opening 36, 37 in such a way that the range of rotation of the wing 35 is limited to a predetermined desired range of rotation of the wing 35 around the longitudinal axis L, as when these limits are reached the attachment connectors form an abutment for the side of the circumference of their opening. According to alternative embodiments instead of the attachment connectors, any other suitable element of the cable system, such as for example the cables 62, 64 themselves could extend through the corresponding opening to the intermediate attachment location 43 and interact with the corresponding opening in substantially the same way as described above for limiting the range of rotation of the wing 35 to the predetermined desired range of rotation.

Figure 14:
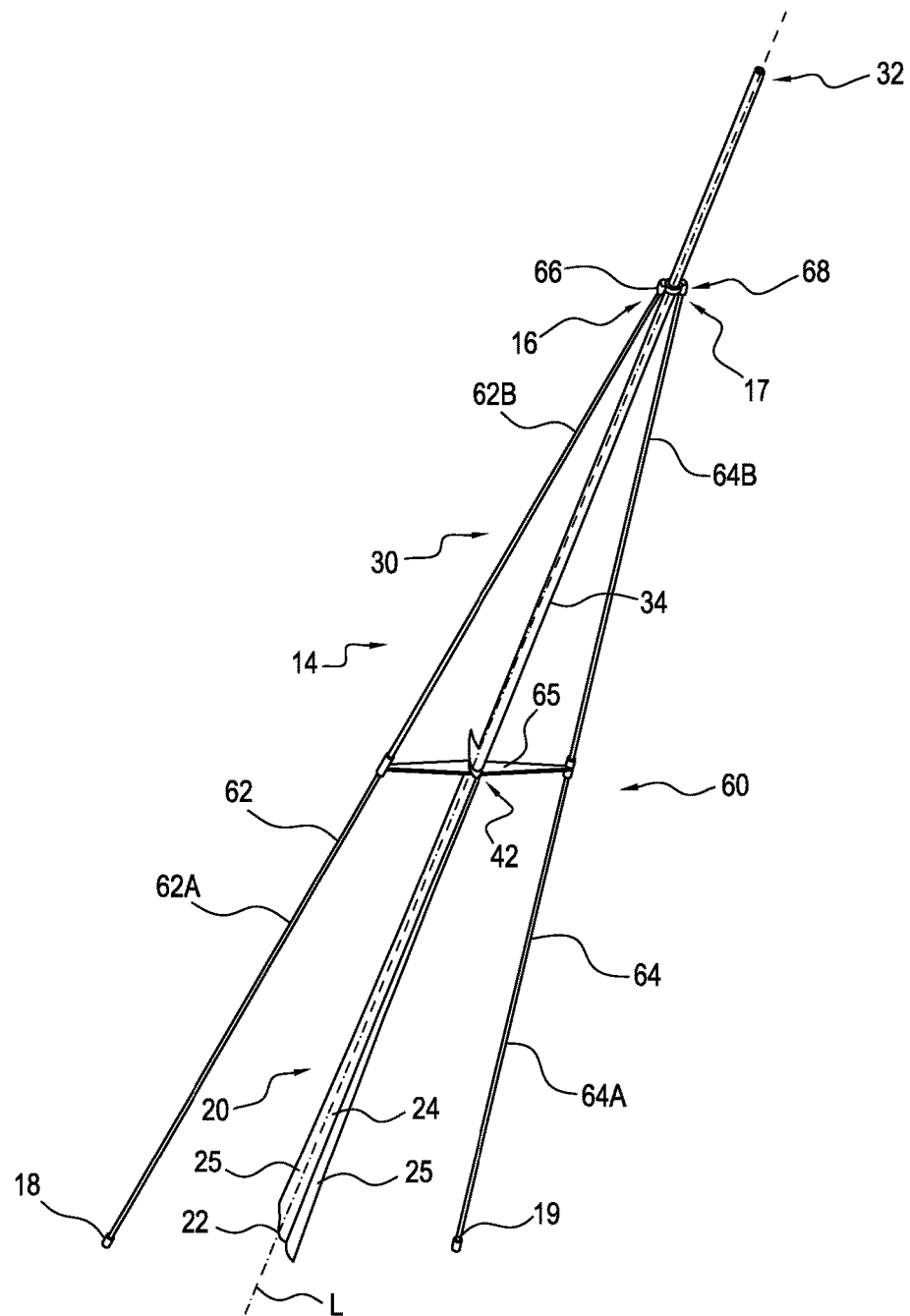

FIG. 14 shows the embodiment of the vane 14 of FIGS. 10-13 without the wing being present for more clearly showing the radial tube 34 which is to be inserted in the internal cavity 38 of the wing 35 when mounted. According to this embodiment, as shown, the tube 24 of the central vane part 20 comprises two reinforcement ribs that extend generally transverse to the plane of both cables 62, 64 and provide additional rigidity against forces transverse to plane of the cables 62, 64. Further also the a spreader 35 is provided at the intermediate point 42 that extends transverse to the longitudinal axis of the vane 14 and provides further vane attachment points for the cables 62, 64 at the intermediate point 42, such that the position of the cables 62, 64; especially in the vicinity of the wing 35 is securely determined. It is clear that at both the vane attachment points at the intermediate point 42 and the intermediate attachment location the distance from the longitudinal axis L of the vane 14 to the vane attachment points 16, 17 is smaller than the distance from the longitudinal axis L of the vane 14 to the hub attachment points 18, 19.

Although variations of the respective lengths of the central vane part 20 and the radial vane part 30 are possible, in order to provide for an optimal transportation in the disassembled condition of the rotor assembly, preferably the central vane part 20 has a length in the range of 30% to 300% of the length of the radial vane part 30, for example in the range of 50% to 200%, preferably 75% to 150%, such as for example approximately the same size.

It is clear that further alternative embodiments are possible, other than the embodiments described above as long as in general the rotor assembly does not comprise any further elements forming a direct structural connection between two of said plurality of vanes 14 at a location other than their central end 22. Such a direct structural connection, for example by means of a cable, a rod, a rim, etc. increases the risk that peak loads are induced in the vanes 14 as explained above. This risk is avoided, as described above, when the plurality of vanes 14 are only structurally interconnected via the central hub 12 and the cable system 60 comprises only one single pair of cables 62, 64 per vane 14, both cables 62, 64 of which are attached between vane attachment points 16, 17 at the location between the central end 22 and the radial end 32 and hub attachment points 18, 19 at the location of the central hub 12, both these cables 62, 64 being fitted in such a manner that they are aligned with the longitudinal axis L of their vane 14, viewed along the central rotation axis R; and they are both on either side of the plane covered by the longitudinal axis L of their vane 14.

It is clear that the cables 62, 64 in use in the cable system 60 according to an embodiment could be formed as cables comprising two or more wires running side by side and bonded, twisted, or braided together to form a single assembly. However according to alternative embodiments the cables 62, 64 could alternatively also be formed as cable like elongate links, such as for example suitable elongate rod or bar. These cable like elongate links generally comprise a higher stiffness along their longitudinal direction, which reduces the level of pre-tensioning to be provided to the cable system 62, 64.

It is further clear that the cables 62, 64 according to the embodiments described above could be formed as a continuous cable extending from its vane attachment point 16, 17 to its hub attachment point 18, 19, but according to alternative embodiments, could also comprise a suitable sequence of a plurality of sequentially connected cable portions 62A, 62B, 64A, 64B, as for example schematically shown in FIG. 14 in which the cables 62, 64 each comprise two sequentially connected rods which are connected at the location of the spreader 65. It is clear that further alternative embodiments are possible in which two more cable portions are sequentially connected for forming the cable as long as the longitudinal axis of each of the cable portions substantially coincides with that of the entire cable.

Obviously, the invention is not limited to the embodiments which have been described by way of example and illustrated in the drawings, but also comprises all the alternatives and combinations which fall within the scope of protection of the claims.

The invention claimed is:

1. A rotor assembly for a wind turbine, the rotor assembly comprising:
    a central hub with a central rotation axis; and
    a plurality of vanes, each vane of said plurality of vanes attached to the central hub by its central end, and each extending from the central end up to its radial end along a longitudinal axis substantially radially with respect to the central rotation axis, and each vane of said plurality of vanes also including
        an intermediate point situated between the central end and the radial end;
        a central vane part which extends from the central end to the intermediate point;
        a radial vane part which is attached to the central vane part and extends from the intermediate point to the radial end, only the radial vane part comprising a wing having a shape which is suitable to be driven by the wind; and
        a cable system which cooperates with the central hub, the cable system comprising only a single pair of cables per each vane of said plurality of vanes, the pair of cables each being attached between respective vane attachment points at a location between the central end and the radial end and hub attachment points at the location of the central hub, each of the pair of cables being fitted in such a manner that:
            both of said cables are aligned with the longitudinal axis of the respective vane, viewed along the central rotation axis; and
            said cables being on opposing sides of a plane covered by the longitudinal axis of the respective vane,
        wherein the plurality of vanes are only structurally interconnected via the central hub, and
        wherein each of the central vane parts comprises a tube extending along the longitudinal axis of the respective vane; and each of the radial vane parts comprises a tube extending along the longitudinal axis of the respective vane, the tube of the radial vane part being adapted to be fitted to the tube of the central vane part,
        wherein for each vane of said plurality of vanes, the wing is rotatably attached to the tube of the radial vane part,
        wherein the wing, comprises an internal cavity extending along the longitudinal axis of the respective van into which the tube of the radial vane part can be introduced,
        wherein the respective attachment points are at an intermediate attachment location in between the intermediate point and the radial end, and
        wherein:
            the respective vane attachment points are located on the tube of the radial vane part; and
            the wing comprises, for each of the cables of each vane of said plurality of vanes, an opening through which the cable system extends to the intermediate attachment location, the opening being dimensioned such that it allows for a predetermined range of rotation of the wing around the longitudinal axis.

2. The rotor assembly according to claim 1, wherein the rotor assembly does not comprise any further elements forming a direct structural connection between two of said plurality of vanes at a location other than said central end.

3. The rotor assembly according to claim 1, wherein, for each vane, a distance from the longitudinal axis of the vane to the respective vane attachment points is smaller than a distance from the longitudinal axis of the vane to the hub attachment points.

4. The rotor assembly according to claim 1, wherein for each vane of said plurality of vanes, the tube of the radial vane part is fitted to the tube of the central vane part at a location of the intermediate point.

5. The rotor assembly according to claim 1, wherein the cable system of each vane of said plurality of vanes comprises at least one vane attachment connector configured to:
    attach at least one of the cables to the tube of the radial vane part; and
    to interact with the opening such that an actual range of rotation of the wing is limited to the predetermined range of rotation of the wing around the longitudinal axis.

6. The rotor assembly according to claim 1, wherein both cables are attached at vane attachment points at the location of the intermediate point.

7. The rotor assembly according to claim 1, wherein the central vane part has a length in the range of 20% to 200% of the length of the radial vane part.

8. A method of manufacturing a rotor assembly according to claim 1, the method comprising:

producing the wing as a twisted extruded profile including twisting the wing about the longitudinal axis of the wing such that said twisted extruded profile has a degree of twist per meter of length of the wing in the range of 0.5° to 5°; and manufacturing the twisted extruded profile by means of an extrusion process using a twisted extrusion die channel with a predetermined degree of twist per meter of length of a die channel along the longitudinal axis of the wing in the range of 1° to 5°.

9. A rotor for a wind turbine, the rotor assembly comprising:

a central hub with a central rotation axis; and a plurality of vanes, each vane of said plurality of vanes attached to the central hub by a central end of each, and each extending from the central end up to a radial end along a longitudinal axis substantially radially with respect to the central rotation axis, and each vane of said plurality of vanes also including an intermediate point situated between the central end and the radial end;

a central vane part which extends from the central end to the intermediate point;

a radial vane part which is attached to the central vane part and extends from the intermediate point to the radial end, only the radial vane part comprising a wing having a shape which is suitable to be driven by the wind; and a cable system which cooperates with the central hub, the cable system comprising only a single pair of cables per each vane of said plurality of vanes, the pair of cables each being attached between respective vane attachment points at a location of the central hub, each of the pair of cables being fitted in such a manner that:

both of said cables are aligned with the longitudinal axis of the respective vane, viewed along the central rotation axis; and said cables being on opposing sides of a plane covered by the longitudinal axis of the respective vane, wherein the plurality of vanes are only structurally interconnected via the central hub, and wherein each of the central vane parts comprises a tube extending along the longitudinal axis of the respective vane; and each of the radial vane parts comprises a tube extending along the longitudinal axis of the respective vane, the tube of the radial vane part being adapted to be fitted to the tube of the central vane part, and wherein both cables are attached at vane attachment points at the location of the intermediate point, wherein the vane attachment points are located on one of the tubes at a location which is not covered by the wing.

10. A rotor assembly for a wind turbine, the rotor assembly comprising:

a central hub with a central rotation axis; and a plurality of vanes, each vane of said plurality of vanes attached to the central hub by a central end, and each extending from the central end up to a radial end along a longitudinal axis substantially radially with respect to the central rotation axis, and each vane of said plurality of vanes including an intermediate point situated between the central end and the radial end;

a central vane part which extends from the central end to the intermediate point;

a radial vane part which is attached to the central vane part and extends from the intermediate point to the radial end, only the radial vane part comprising a wing having a shape which is suitable to be driven by the wind; and a cable system which cooperates the central hub, the cable system comprising only a single pair of cables per each vane of said plurality of vanes, the pair of cables each being attached between respective vane attachment points at a location between the central end and the radial end and hub attachment points at the location of the central hub, each of the pair of cables being fitted in such a manner that:

both of said cables are aligned with the longitudinal axis of the respective vane, viewed along the central rotation axis; and said cables being on opposing sides of a plane covered by the longitudinal axis of the respective vane, wherein the plurality of vanes are only structurally interconnected via the central hub, and the cable system of each of said vanes has only one single pair of cables wherein both cables are attached at vane attachment points at an intermediate attachment location in between the intermediate point and the radial end, and wherein:

the vane attachment points are located on the tube of the radial vane part; and the wing comprises, for each of the cables of each vane of said plurality of vanes, an opening through which the cable system extends to the intermediate attachment location, the opening being dimensioned such that it allows for a predetermined range of rotation of the wing around the longitudinal axis.

11. The rotor assembly according to claim 10, wherein the rotor assembly does not comprise any further elements forming a direct structural connection between two of said plurality of vanes at a location other than said central end.

12. The rotor assembly according to claim 10, wherein, for each vane, a distance from the longitudinal axis of the vane to the respective vane attachment points is smaller than a distance from the longitudinal axis of the vane to the hub attachment points.

13. The rotor assembly according to claim 10, wherein each of the central vane parts comprises a tube extending along the longitudinal axis of the respective vane; and each of the radial vane parts comprises a tube extending along the longitudinal axis of the respective vane, the tube of the radial vane part being adapted to be fitted to the tube of the central vane part.

14. The rotor assembly according to claim 10, wherein for each vane of said plurality of vanes, the tube of the radial vane part is fitted to the tube of the central vane part at a location of the intermediate point.

15. The rotor assembly according to claim 13, wherein for each vane of said plurality of vanes, the wing is rotatably attached to the tube of the radial vane part.

16. The rotor assembly according to claim 15, wherein the wing, comprises an internal cavity, extending along the longitudinal axis of the vane, into which the tube of the radial vane part can be introduced, such that said wing is rotatably attached to the tube of the radial vane part.

17. The rotor assembly according to claim 10, wherein the cable system each vane of said plurality of vanes comprises at least one vane attachment connector configured to:

attach at least one of the cables to the tube of the radial vane part; and to interact with the opening such that an actual range of rotation of the wings is limited to the predetermined range of rotation of the wing around the longitudinal axis.

18. The rotor assembly according to claim 10, wherein both cables are attached at vane attachment points at the location of the intermediate point.

19. The rotor assembly according to claim 10, wherein the central vane part has a length in the range of 20% to 200% of the length of the radial vane part.

* * * * *